Sept. 7, 1965  B. E. STENTZ  3,205,033
TRAY SUPPORT AND THERMAL WALL FOR A HOT AND
COLD FOOD SERVICE CART
Filed Nov. 21, 1961  3 Sheets-Sheet 1
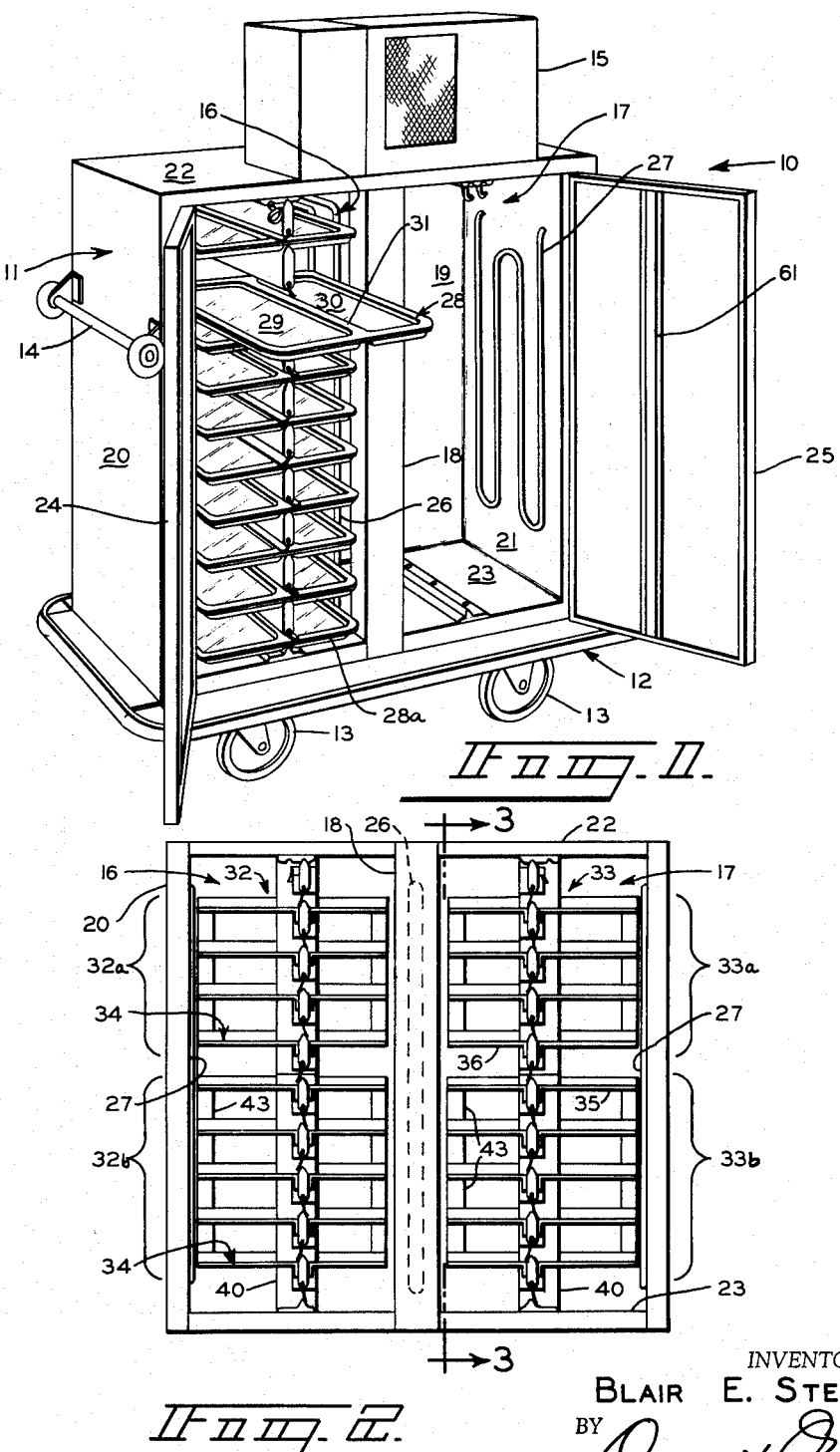
INVENTOR.
BLAIR E. STENTZ
BY Owen & Owen
ATTORNEYS

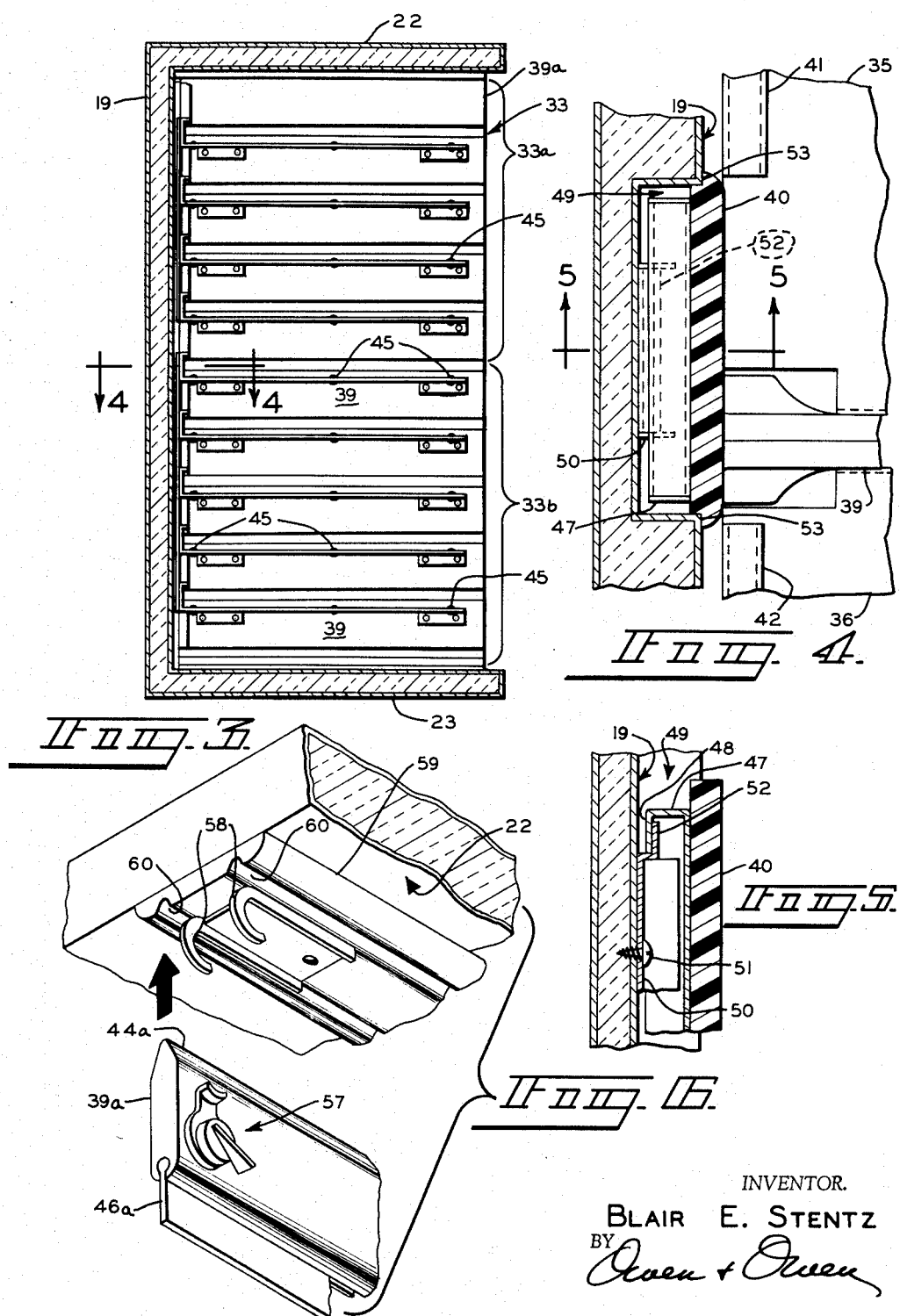

Sept. 7, 1965 B. E. STENTZ 3,205,033
TRAY SUPPORT AND THERMAL WALL FOR A HOT AND
COLD FOOD SERVICE CART
Filed Nov. 21, 1961 3 Sheets-Sheet 3

INVENTOR.
BLAIR E. STENTZ
BY Owen + Owen
ATTORNEYS

United States Patent Office 3,205,033
Patented Sept. 7, 1965

3,205,033
TRAY SUPPORT AND THERMAL WALL FOR A HOT AND COLD FOOD SERVICE CART
Blair E. Stentz, Murfreesboro, Tenn., assignor to United Service Equipment Co., Inc., Palmer, Mass., a corporation of Delaware
Filed Nov. 21, 1961, Ser. No. 154,005
7 Claims. (Cl. 312—236)

This invention relates to hot and cold food service apparatus wherein a plurality of individual trays, each bearing both hot and cold food items can be assembled, stored and delivered while maintaining the separate hot and cold items at their respective temperatures and more particularly to means for supporting the trays of food and dividing the compartments of the food service apparatus into hot and cold zones, a device of the invention functioning thus as a tray support and thermal wall.

In co-pending application of Stentz and Conklin, Serial No. 846,159, filed October 13, 1959, there is disclosed a hot and cold food service cart having one or more compartments, each of the compartments being divided into two zones, and having means for supporting a plurality of trays in the zones with each tray having a hot portion and a cold portion upon which foods at the respective temperatures are placed, and the trays being inserted into the compartment or compartments with their corresponding portions in the proper temperature zones of those compartments.

It is the principal object of the instant invention to provide an improved tray support and thermal wall which functions to divide such a compartment into its two zones whether or not trays are present in the compartment and which also functions as a support for such trays in such a compartment.

It is a further object of the instant invention to provide a tray support and thermal wall for such a food cart or other food delivery device which can be readily removed from the cart or chamber in which it is located thereby to facilitate cleaning and the maintenance of sanitary conditions within the compartment.

It is yet another object of the instant invention to provide a tray support and thermal wall for such a food service device which is adapted to be removed from one compartment and inserted in an adjacent compartment wherein the relative positions of the hot and cold zones are reversed and thereby to reverse the positioning of the trays in both compartments so that in one arrangement larger areas of the trays are provided for hot foods, for example during winter months, and in another arrangement the larger areas of the trays are provided for cold foods, for example during the summer season.

These and other more specific objects and advantages of the invention will be better understood from the specification which follows and from the drawings in which:

FIG. 1 is a view in perspective of a food service cart of the type disclosed in the above-mentioned Stentz and Conklin application showing two adjacent compartments with trays supported in one of the compartments by a tray support means and thermal wall according to the instant invention and the other compartment being illustrated empty, i.e., with the tray support and thermal wall removed therefrom;

FIG. 2 is a front view in elevation showing a pair of thermal walls and tray guides assembled in two adjacent compartments of a food carrier such as the cart illustrated in FIG. 1;

FIG. 3 is a vertical sectional view taken along the line 3—3 of FIG. 2 and shown on an enlarged scale;

FIG. 4 is a fragmentary, horizontal sectional view taken along the line 4—4 of FIG. 3 and shown on a greatly enlarged scale;

FIG. 5 is a fragmentary, vertical sectional view taken along the line 5—5 of FIG. 4;

FIG. 6 is a fragmentary view in perspective illustrating how a thermal wall and tray guide according to the invention is removably assembled in a compartment of a food carrier such as the food cart illustrated in FIG. 1;

Figure 7:
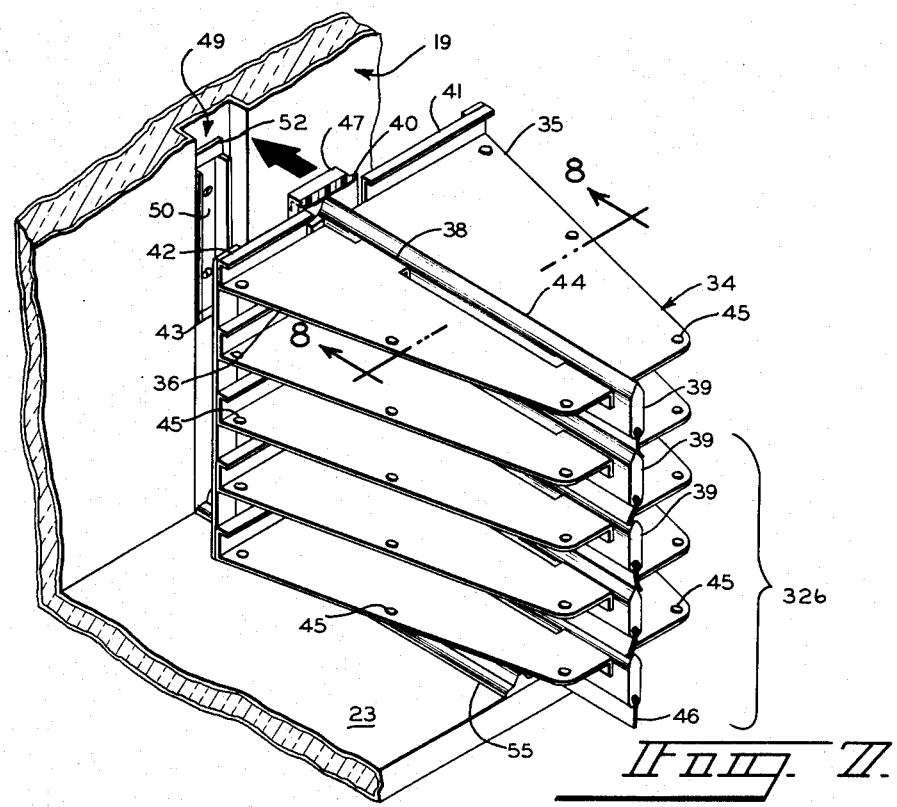
FIG. 7 is a fragmentary view in perspective showing a unit of a tray support and thermal wall according to the invention, the unit shown being a lower unit and the figure illustrating how this unit is assembled in a compartment.

A food cart generally indicated by the reference number 10 in FIG. 1 is of the general type disclosed in the above-mentioned Stentz and Conklin application. The food cart 10 has a rectilinear housing 11 which is mounted upon a base frame 12 and the frame 12 is provided with appropriate casters 13. The cart 10 may also have a handle 14 and a suitable refrigeration mechanism, for example enclosed within a housing 15 mounted on top of the cart 10. The cart 10 is also provided with appropriate switches and electrical connections for energizing the refrigerator mechanism enclosed in the housing 15 as well as zone heaters which are located in appropriate portions of the housing 11 as will be described below.

The particular cart 10 disclosed in FIGURE 1 is illustrative only of the type of food service and delivery equipment which is adapted to be fabricated with one or more compartments, each compartment functioning to receive a plurality of food trays having divided surfaces with hot foods in one portion and cold foods in the other. In the particular cart 10 of FIG. 1, there are shown two tray compartments 16 and 17 which are not separated from each other thermally by an intermediate divider 18 and which are defined by an insulated back wall 19, end walls 20 and 21, top 22 and bottom 23. Each of the two compartments 16 and 17 has its own insulated door 24 or 25, respectively. In the food cart illustrated in FIG. 1, the arrangement of parts is such that an evaporator coil 26 of the refrigeration mechanism located in the housing 15 is positioned back of the divider 18. In this arrangement, the adjacent portions of the two compartments 16 and 17 are the cold zones of the two compartments 16 and 17. Similarly, each of the compartments 16 and 17 is provided with a heater coil 27 being mounted upon the end walls 20 and 21.

The arrangement of a single refrigerator evaporator 26 at the center of the cart housing 11 with a heating coil 27 at each of its end walls provides for the establishment and maintenance of a center cold zone and two bordering, outer hot zones. These zones are intended to receive and maintain the temperature of corresponding portions of divided meal trays 28 each of which has a larger food area 29 and a smaller food area 30. In the arrangement illustrated in FIGS. 1 and 2, the trays 28 are supported by a tray support and thermal wall according to the invention with their smaller areas 30 in the central part of the housing 11 which is maintained at a cool temperature by the evaporator 26, for the placement and storage of cold foods. The larger food areas 29 of the trays 28 are located in one or the other of the outer hot zones where the higher temperature is maintained by the respective one of the heating coils 27. Each of the trays 28 has a rib or partition 31 extending from end to end and separating the smaller area 30 from the larger area 29.

Tray support and thermal walls according to the invention are generally indicated by the reference numbers 32 and 33, there being one of the tray supports and thermal walls 32 or 33 for each of the compartments 16 and 17. Each of the tray supports 32 or 33 is illustrated as being designed for the support of nine of the compartmented trays 28 and as being divided, for ease of handling, into two vertically superposed units, viz., an upper unit indicated by the bracket 32a or 33a and capable of supporting four trays 28, and a lower unit indicated by the bracket 32b or 33b and capable of supporting five of the trays 28. A tenth tray 28, for example the tray indicated by the reference number 28a in FIG. 1, rests upon the bottom 23 of the housing 11 in each of the compartments 16 and 17. Each of the tray support sections 32a or 32b is assembled from a plurality of individual tray supports 34 (see also FIG. 7), each of the individual tray supports 34 comprising a pair of support plates 35 and 36 which have turned down flanges 37 and 38 respectively, at their inner sides and by which flanges 37 and 38 the plates 35 and 36 are riveted or otherwise secured to opposite sides for a divider partition 39. Each of the divider partitions 39 is fabricated from two mating hollow halves adhered together along the vertical median plane, and each of which is molded of a synthetic resinous material which may, if desired, be reinforced by suitable means such as glass fibers, and which has sufficient structural strength so that the partition 39 can be secured to a riser 40 at its rear end. The hollow interior of the partition 39 may be filled with a foamed-in-place resinous foam in order to improve its thermal-barrier characteristics. Each of the plates 35 and 36 has an upwardly turned overhanging flange 41 or 42, respectively, at its rear edge, and the outer ends of the flanges 41 and 42 are welded, riveted or otherwise secured to vertical bracing bars 43 to give the structure rigidity. Each of the divided partitions 39 has an upwardly protruding rib 44 of such configuration as to closely fit the underside of the tray rib 31 and which extends above the horizontal level determined by the top surfaces of the plates 35 and 36 a distance such that when one of the trays 28 is lying upon glide buttons 45 which are carried by the plates 35 and 36, the divided rib 44 snugly fits the inner, underside of the tray rib 31. A flap 46 of such vertical length as to overlap the upper surface of the rib 44 on the next lower one of the individual tray supports 34 when no tray 28 is interposed therebetween, is positioned between the halves of each partition 39 at its lower end.

All of the individual tray supports 34, each consisting of the cooperative plates 35 and 36 and the divider partition 39, are identical in construction and function. However, an uppermost one of the divider partitions, which is indicated particularly by the reference number 39a (see FIGS. 3 and 6, particularly) on each of the units 32a or 33a functions solely as a divider for the space above the uppermost one of the meal trays 28 and does not carry or cooperate with tray supporting plates such as the plates 35 and 36. The uppermost divider partition 39a has a top rib 44a (see FIG. 6) and carries a bottom flap 46a.

The riser 40 of the lower tray support unit 32b or 33b, as the case may be, is carried by an open-backed, flat metal box 47 (see FIGS. 4, 5 and 7) at the upper end of which there is an overhanging transverse lip 48. At the center of each of the compartments 16 and 17, the back wall 19 has a vertically extending recess 49 (FIG. 7) for the reception of the box 47 and in which there is located a support plate 50. The plate 50 is secured, for example by screws 51, to the back wall 19 at the back of the recess 49 and has a forwardly spaced, upwardly extending catch 52 over which the lip 48 of the box 47 is adapted to be engaged.

The entire lower unit 32b or 33b of the tray support and thermal wall 32 or 33, respectively, may be inserted into or removed from either of the compartments 16 or 17 simply by engaging or disengaging, as the case may be, the lip 48 from the catch 52. Insertion of the lower unit is illustrated in FIG. 7 where it can be seen that by moving the lower unit 32b rearwardly and then sliding it downwardly a short distance, the lip 48 engages behind the catch 52. The vertical edges of the riser 40 are rabbeted as indicated by the reference numbers 53 in FIG. 4 so that after the lower tray support unit 32b is moved into place, the edges of the riser 40 make tight engagement with forwardly protruding vertical corners between the sides of the recess 49 and the main flat wall 19 at the back of the housing 11.

Figure 8:
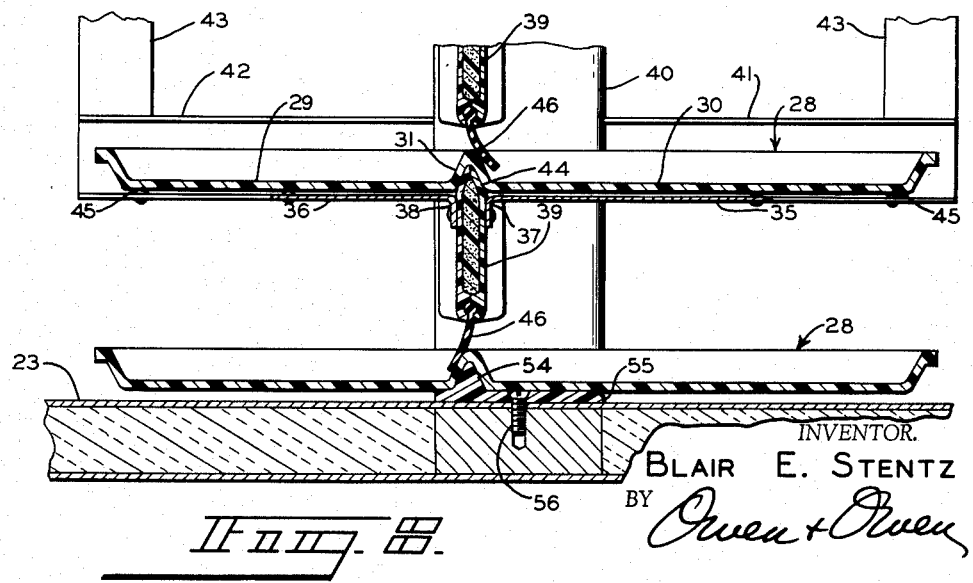
FIG. 8 is a fragmentary sectional view taken along the line 8—8 of FIG. 7 and shown on an enlarged scale.

The lowermost one of the divider partitions 39 (see FIG. 8) is identical in construction with all of the remaining divider partitions 39 having an upper rib 44 and a lower flap 46, but the flap 46 cooperates with a rib 54 on a bottom divider plate 55 removably secured by centrally located screws 56 to the bottom 23 of the respective one of the compartments 16 or 17. It will be observed in FIG. 8 that the rib 54 is laterally offset from the median line of the plate 55 but that the screws 56 extend along the median line. The lateral offset of the rib 54 matches the lateral offset of the divider partitions 39 brought about by reason of difference in dimensions of the plates 35 and 36 which, in turn, results from the difference in the dimension of the tray areas 29 and 30 discussed above.

The upper one of the tray support and thermal wall units 32a or 33a, respectively, is constructed substantially identically with the construction of the lower units 32b and 33b except for the difference in the uppermost divider partition 39a already described above. The upper unit 32a or 33a, respectively, is removably mounted in the particular compartment 16 or 17 by sliding it in horizontally so that its riser 40 engages in the upper portion of the back recess 49 and then engaging a latch 57 (see FIG. 6) with the proper one of a pair of hooks 58 which are secured to and depend from a top barrier plate 59 that is secured to the underside of the top 22 at the center of its respective compartment 16 or 17. The top barrier plate 59 has a pair of grooves 60 of such size as to receive the rib 44a on the uppermost one of the divider partitions 39a of the particular upper unit 32a or 33a of the tray support and thermal wall. Each of the grooves 60 is spaced laterally from the median line of the upper barrier plate 59 and its respective compartment 16 or 17 a distance corresponding to one-half of the lateral offset resulting from the difference in area of the tray areas 29 and 30, and correspondingly, the tray support plates 35 and 36.

As earlier discussed, a tray support and thermal wall 32 or 33 according to the invention is adapted for quick and easy removal to facilitate cleaning and sanitation of the interior of the food carrying compartments 16 and 17 and also to provide for reversal of the relationships of the larger and smaller areas 29 and 30 of the food trays 28 with respect to the heated and cooled zones of the compartments 16 and 17. In the arrangement of the food cart illustrated in the drawings, the tray supports and thermal walls 32 and 33 are set up so that the smaller areas 30 of the food trays 28 are located at the center portion of the housing 11, i.e., the adjacent smaller zones of the compartments 16 and 17 which are chilled by the evaporator coil 26. Correspondingly, the larger areas 29 of the food trays 28 are located in the outer zones of the compartments 16 and 17 which are heated. This arrangement of the assembled parts provides larger areas for the hot dishes and smaller areas for the cold dishes. When it is desired to serve dinners having larger cold entrées, for example during warmer months, both of the tray supports and thermal walls 32 and 33 may be removed from the compartments 16 and 17 respectively, in which they are illustrated and transferred to the opposite compartments. This is accomplished by first detaching the latches 57 from the respective ones of the hooks 58 with which they are engaged in the two compartments 16 and 17 and removing the upper sections 32a and 33a from the housing 11. The lower sections 32b and 33b are then removed by lifting them vertically a slight distance to disengage the lips 48 from the catches 52 and they also are taken out of the compartments 16 and 17. The screws 56 holding the bottom barrier plates 55 are then unscrewed and the plates 55 are exchanged between the two compartments 16 or 17 or each of them may be reversed in an end-to-end fashion to shift its rib 54 from, say, the right side of the median line as illustrated in FIG. 1 and compartment 16, to the left side of that median line or conversely from the left side of the median line as illustrated in compartment 17 to the right side of the median line. In this instance, the rib 54 (FIG. 8) which is illustrated in the drawings as being aligned with the left-hand one of the grooves 60 (FIG. 6) in the upper thermal barrier plate 59 is shifted to the right so that it would then align with the right-hand one of the grooves 60. The tray support and thermal wall assembly 32 which is illustrated in the drawings as being located in the compartment 16 is then inserted into the compartment 17, the lower section 32b being first inserted and the upper section 32a being secondly inserted. The latch 57 (FIG. 6) on the upper section 32a of the tray support 32 is engaged with the right-hand one of the hooks 58 in the compartment 17. Similarly, the tray support 33 is inserted into the compartment 16. As a result of this interchange, the larger areas of the tray supports, i.e., those formed by the larger plates 35 are located at the central part of the housing 11 and the divider partitions 39 wind up being spaced farther from the evaporator coil 26 to enlarge the central zone of the housing 11 which is located between the two sets of divider partitions 39. The individual service trays 28 are then inserted into each of the compartments 16 and 17 in reversed position, i.e., with their larger areas 29 at the center part of the housing 11 and their smaller areas 30 at the outer parts of the housing 11.

The difference in width of the larger plates 35 and smaller plates 36, and the corresponding difference in the size of the tray areas 29 and 30, preclude the insertion of a tray into either of the compartments 16 or 17 with the hot foods in the cold zone or the cold food in the hot zone, regardless of which is the zone of larger area.

Both doors 24 and 25 have vertical thermal seals 61 which engage the front ends of the divider partitions 39 in order to complete the thermal insulation of the central, common cold zone of the compartments 16 and 17 from the hot zones at each side.

The space within the compartments 16 and 17 from front to back is such that when trays 28 are in place in either and its door 24 or 25 is closed, contact between the thermal seal 61 on the door and the front edges of the trays 28 pushes them inwardly against the flanges 41 or 42 and beneath their overhanging portions to prevent the trays from tipping forwardly during transit of the conveyor between, say, kitchen and point of service.

The tray slides 45 keep the trays 28 out of contact with the flat surfaces of the plates 35 and 36 both to improve circulation within the respective temperature zones and to eliminate discoloration which might be transferred to bed linens of patients being fed from the trays.

Having described my invention, I claim:

1. A tray support and thermal wall for a walled tray compartment of a food service apparatus comprising, in combination, a plurality of vertically superposed heat insulating thermal barriers, mounting means for supporting said thermal barriers in a single generally vertical array extending from front to back of said compartment for dividing said compartment into thermally different zones, each of said thermal barriers comprising a vertically extending elongated partition, and cooperating closure means on the bottom and top, respectively of each partition, of each vertically superposed and proximately spaced pair of said partitions for effecting thermal sealing engagement therebetween along their lengths, said closure means being disengageable by the insertion of a food tray longitudinally therebetween, a pair of tray support plates mounted on each of said partitions near the upper edge thereof and extending laterally outwardly therefrom in a common horizontal plane for supporting the tray inserted between said closure means on said partitions, and disengageable cooperating means on a wall of said compartment and on said mounting means for removably supporting said support and wall in said compartment.

2. A tray support and thermal wall according to claim 1 in which each of said partitions has an upwardly extending rib on its upper edge and a downwardly extending flap on its lower edge, said flaps contacting the ribs of lower partitions when no tray is present therebetween and being displaceable by contact with the upper surface of a tray inserted therebetween.

3. In an apparatus for storing and delivering compartmented trays of hot and cold foods, at least one storage compartment having a back, top and bottom walls, means for maintaining different temperature levels in opposite vertically extending zones of said compartment, said compartment having horizontal dimensions substantially the same as the horizontal dimensions of the trays to be stored therein, thermal barrier means forming a common wall between said zones for dividing said compartment according to the compartmentation of such trays, said thermal barrier means comprising a vertical array of partitions, means for supporting said partitions in vertically spaced relationship, whereby spaced slots are defined therebetween, tray supports carried by each of said partitions at a level near the lower edge of each of said slots, means on each of said partitions for closing the slot therebelow being displaced by contact with the upper surface between the compartments of a tray upon the insertion of such tray in such slot, cooperating means on said partition supporting means and on the common wall of said compartment for removably positioning said supporting means in said compartment, cooperating thermal barrier means on the top and bottom walls of said compartment for sealing off the spaces above the uppermost and below the lowermost ones of said partitions, and a door for said compartment.

4. An apparatus according to claim 3 having two side-by-side compartments defined by end walls, common top, bottom and back walls, with free air circulation between the neighboring zones of said two compartments, temperature control means located between said compartments for maintaining the neighboring zones thereof at a common temperature, a thermal barrier and tray support means for each of said compartments, the cooperating means on the walls of each said compartments being offset from the median of each of said compartments whereby said barrier means divide said compartments into zones of unequal horizontal area and the neighboring zones of said compartments being of the same horizontal area, said cooperating means providing for two laterally spaced alternate positions of said thermal barriers for reversing the relative sizes of the zones in each compartment.

5. A thermal barrier and tray support for a tray having two compartments separated by a rib, said thermal barrier comprising a vertically extending elongated partition, a flap on the lower edge thereof and a rib on the upper edge thereof, means for mounting said partition in spaced relation to a next lower or upper one of said thermal barriers, said flap having a vertical length sufficient to engage the rib on said lower barrier, a pair of tray support plates mounted on and extending outwardly from said partition at a level below the upper edge of its rib, said partition rib being adapted to engage the under side of the rib of a tray resting on said tray support plates, the insertion of a tray onto said support plates acting to displace said flap of a next upper one of said thermal barriers out of engagement with the lower partition rib and into engagement with the upper side of the rib of such tray, and means for removably supporting said thermal barrier and similar thermal barriers in vertical array in a compartment.

6. A tray support and thermal wall for a walled tray compartment of a food service apparatus comprising, in combination, a plurality of vertically superposed heat insulating thermal barriers, mounting means for supporting said thermal barriers in a single, generally vertical array extending from front to back of such compartment for dividing said compartment into thermally different zones, each of said thermal barriers comprising a vertically extending partition and cooperating closure means on the bottom and top of such partition for effecting thermal sealing engagement with a similar vertically superposed and proximately spaced thermal barrier, said closure means being disengageable by the insertion of a food tray longitudinally therebetween, a pair of tray support plates mounted on each of said partitions and extending laterally outwardly therefrom in a common horizontal plane for supporting a tray inserted between said closure means on said partitions, and disengageable cooperating means on a wall of said compartment and on said mounting means for removably supporting said tray support and thermal wall in said compartment.

7. A tray support and thermal wall according to claim 6 in which each of said partitions has an upwardly extending rib on its upper edge and a downwardly extending flap on its lower edge, said flaps contacting the ribs of lower partitions when no tray is present therebetween and being displaceable by contact with the upper surface of a tray inserted therebetween.

References Cited by the Examiner

UNITED STATES PATENTS

| | | | |
|---|---|---|---|
| 1,669,057 | 5/28 | Katzinger | 206—72 |
| 1,907,414 | 5/33 | Antrim | 312—236 |
| 2,327,246 | 8/43 | Bunjes | 268—21 |
| 2,386,368 | 10/45 | Taylor | 34—194 X |
| 2,636,797 | 4/53 | Alheit | 312—128 |
| 2,805,453 | 9/57 | Petronello | 20—62 X |
| 2,845,780 | 8/58 | Conklin | 312—350 X |
| 3,042,384 | 7/62 | Bauman | 312—236 X |

FRANK B. SHERRY, *Primary Examiner.*

GEORGE L. BREHM, *Examiner.*